(12) United States Patent
Nagashima

(10) Patent No.: US 11,796,848 B2
(45) Date of Patent: Oct. 24, 2023

(54) DISPLAY DEVICE AND DISPLAY AUXILIARY MEMBER

(71) Applicant: Nagashima Kougei Co., Ltd., Kasukabe (JP)

(72) Inventor: Yoichi Nagashima, Kasukabe (JP)

(73) Assignee: Nagashima Kougei Co., Ltd.

( * ) Notice: Subject to any disclaimer, the term of this patent is extended or adjusted under 35 U.S.C. 154(b) by 0 days.

(21) Appl. No.: 17/913,077

(22) PCT Filed: Jan. 21, 2021

(86) PCT No.: PCT/JP2021/001981
§ 371 (c)(1),
(2) Date: Sep. 20, 2022

(87) PCT Pub. No.: WO2021/199598
PCT Pub. Date: Oct. 7, 2021

(65) Prior Publication Data
US 2023/0131467 A1     Apr. 27, 2023

(30) Foreign Application Priority Data
Mar. 31, 2020    (JP) .................. 2020-062556

(51) Int. Cl.
*G02F 1/1333*     (2006.01)
*G02F 1/1335*     (2006.01)

(52) U.S. Cl.
CPC .... *G02F 1/13336* (2013.01); *G02F 1/133331* (2021.01); *G02F 1/133526* (2013.01); *G02F 2201/56* (2013.01)

(58) Field of Classification Search
CPC ........... G02F 1/13336; G02F 1/133331; G02F 1/133526; G02F 2201/56; G02F 1/133308; G09F 9/00; G09F 9/40
See application file for complete search history.

(56) References Cited

U.S. PATENT DOCUMENTS 8,432,515 B2    4/2013  Mizushima et al.
8,907,863 B2    12/2014 Li
(Continued)

FOREIGN PATENT DOCUMENTS

CN      1776468 A       5/2006
JP      2003-075863 A   3/2003
(Continued)

OTHER PUBLICATIONS

International Search Report (English and Japanese) issued in PCT/JP2021/001981, dated Mar. 23, 2021; ISA/JP (5 pages).

*Primary Examiner* — Ratisha Mehta
(74) *Attorney, Agent, or Firm* — Harness, Dickey & Pierce, P.L.C.

(57) ABSTRACT

A display device includes: a display having two display panels each having a display-side inclined surface near an outer edge of a display surface, the display being configured to allow parallel arrangement of the two display panels such that the respective inclined surfaces face each other at a joint of the two display panels to form a gap between the inclined surfaces; and at least one translucent part protruding from the display-side inclined surface toward the adjacent display panel in the gap, wherein the translucent part includes in the gap a translucent-side inclined surface that is inclined from one side of the display panel to the other while extending in a direction where the adjacent display panel parts are arrayed.

14 Claims, 9 Drawing Sheets

(56) References Cited

U.S. PATENT DOCUMENTS

| | | |
|---|---|---|
| 9,395,472 B2 | 7/2016 | Kim et al. |
| 9,759,406 B2 | 9/2017 | Sun |
| 10,416,950 B2 | 9/2019 | Kim et al. |
| 2007/0296890 A1 | 12/2007 | Mizushima et al. |
| 2008/0186252 A1 | 8/2008 | Li |
| 2011/0080561 A1* | 4/2011 | Hayashi ................. A61B 3/102 356/511 |
| 2015/0009587 A1 | 1/2015 | Kim et al. |
| 2015/0286457 A1* | 10/2015 | Kim ..................... G06F 3/1446 345/1.3 |
| 2016/0363291 A1* | 12/2016 | Sun ..................... G02B 5/0278 |

FOREIGN PATENT DOCUMENTS

| | | |
|---|---|---|
| JP | 2006-163377 A | 6/2006 |
| JP | 2016-142865 A | 8/2016 |
| JP | 2018-506729 A | 3/2018 |
| JP | 2018-180148 A | 11/2018 |
| JP | 6649317 B2 | 2/2020 |
| KR | 2015-0116218 A | 10/2015 |

\* cited by examiner

DISPLAY DEVICE AND DISPLAY AUXILIARY MEMBER

CROSS REFERENCE TO RELATED APPLICATIONS

This application is a U.S. National Phase Application under 35 U.S.C. 371 of International Application No. PCT/JP2021/001981, filed on Jan. 21, 2021, which claims priority to Japanese Patent Application No. 2020-062556, filed on Mar. 31, 2020. The entire disclosures of the above applications are expressly incorporated by reference herein.

BACKGROUND

Technical Field

The present invention relates to a display device for displaying images and a display auxiliary member used in the display device.

Related Art

In recent years, various proposals have been made for a tiling display that is achieved by lining up a plurality of display panels. For example, a display device has been proposed to make a joint between adjacent display panels less noticeable. This display device includes inclined surfaces that serves as a lens that are provided in the vicinity of outer edges of cover bodies (plate-shaped parts) provided on the surfaces of the respective display panels (see, for example, Japanese Patent No. 6649317). In the display device, the inclined surfaces are located at the joint between the display panels so that an image in the vicinity of the outer edge of one display panel is shifted to a joint-side portion of the adjacent display panel. As a result, for an observer of the display device, an image in the vicinity of the outer edge of the display panel appears to be displayed on the joint between the display panels.

In the above-mentioned display device, the inclined surfaces serving as a lens are provided above the surfaces of the display panels. Therefore, when the thickness of the cover body (plate-shaped part) provided on the surface of each display panel is reduced, the thickness of the lens portion is similarly reduced. Naturally, in this case, the degree of image shift by the lens is reduced accordingly, causing difficulty in displaying the shifted image on the joint of the display panels. On the other hand, when the thickness of the cover body (plate-shaped part) is increased, the thickness of the lens portion is similarly increased. In this case, a sufficient degree of image shift can be secured, though the thickness of the display device itself increases.

In view of these circumstances, an object of the present invention is to provide a display device and a display auxiliary member that are capable of making the joint of adjacent display panels less noticeable by using a gap region at this joint of the adjacent display panels.

SUMMARY

The present invention has been made in order to solve the problems. A display device of the present invention includes: a display part having at least two display panel parts each having a display-side inclined surface part in a vicinity of an outer edge of a display surface, the display part being configured to allow parallel arrangement of the at least two adjacent display panel parts such that the respective display-side inclined surface parts face each other at a joint of the two adjacent display panel parts to form a gap region between the respective display-side inclined surface parts; and at least one translucent part configured with a material having translucency so as to protrude from the display-side inclined surface part as a starting point toward the adjacent display panel part in the gap region, wherein the display-side inclined surface parts are each inclined from the display surface side to an opposite surface side of the display surface while extending toward the outer edge of the display surface, and the translucent part includes in the gap region a translucent-side inclined surface that is inclined from one side to the other side of the display panel part in a thickness direction while extending in an array direction where the adjacent display panel parts are arrayed, and an observer-side surface directed to an observer side of the display panel part.

In the display device of the present invention, when a cross section of the display part and the translucent part, cut in the thickness direction of the display panel parts along the array direction, is sectionally viewed in a direction along the joint of the two display panel parts, the translucent part may have a partial region protruding portion that protrudes from a partial region of the display-side inclined surface part, and the translucent-side inclined surface may be inclined toward the observer side of the display panel parts in the thickness direction while extending from one display panel part, out of the adjacent display panel parts, to the other display panel part along the array direction in the partial region protruding portion.

In the display device of the present invention, when a cross section of the display part and the translucent part, cut in the thickness direction of the display panel parts along the array direction, is sectionally viewed in a direction along the joint of the two display panel parts, the translucent part may have an entire region protruding portion that protrudes from an entire region of the display-side inclined surface part, and the translucent-side inclined surface may be inclined toward the observer side of the display panel parts in the thickness direction while extending from one display panel part, out of the adjacent display panel parts, to the other display panel part along the array direction in the entire region protruding portion.

In the display device of the present invention, the translucent part may be provided for each of the display panel parts, and the two translucent parts, corresponding to the two adjacent display panel parts respectively, may be arranged so as to face each other in the array direction in the gap region.

In the display device of the present invention, the number of the translucent parts arranged in the array direction in the gap region may be one.

In the display device of the present invention, the display surfaces of the display panel parts may each have a flat-shaped display-side flat surface that is directed to the observer side of the corresponding display panel part and is continuous with the corresponding display-side inclined surface part, and the observer-side surface may be flush with or lower than the display-side flat surfaces of the display panel parts in the thickness direction of the display panel parts.

A display auxiliary member of the present invention is a display auxiliary member for use in a display device, the display device including a display part having at least two display panel parts each having a display-side inclined surface part in a vicinity of an outer edge of a display surface, the display-side inclined surface part being inclined from the display surface side toward an opposite surface side of the display surface, while extending to the outer edge of the display surface, the display part being configured to allow parallel arrangement of the at least two adjacent display panel parts such that the respective display-side inclined surface parts face each other at a joint of the two adjacent display panel parts to form a gap region between the display-side inclined surface parts, the display auxiliary member including at least one translucent part configured with a material having translucency so as to protrude from the display-side inclined surface part as a starting point toward the adjacent display panel part in the gap region, wherein the translucent part includes in the gap region a translucent-side inclined surface that is inclined from one side to the other side of the display panel parts in a thickness direction while extending in an array direction where the adjacent display panel parts are arrayed, and an observer-side surface directed to an observer side of the display panel parts. In the display auxiliary member of the present invention, when a cross section of the display part and the translucent part, cut in the thickness direction of the display panel parts along the array direction, is sectionally viewed in a direction along the joint of the two display panel parts, the translucent part may have a partial region protruding portion that protrudes from a partial region of the display-side inclined surface part, and the translucent-side inclined surface may be inclined toward the observer side of the display panel parts in the thickness direction while extending from one display panel part, out of the adjacent display panel parts, to the other display panel part along the array direction in the partial region protruding portion.

Advantageous Effects of Invention

The display device and the display auxiliary member of the present invention can demonstrate an excellent effect of being able to make the joint of adjacent display panels less noticeable by using a gap region at this joint of the adjacent display panels.

DETAILED DESCRIPTION

Figure 1A:
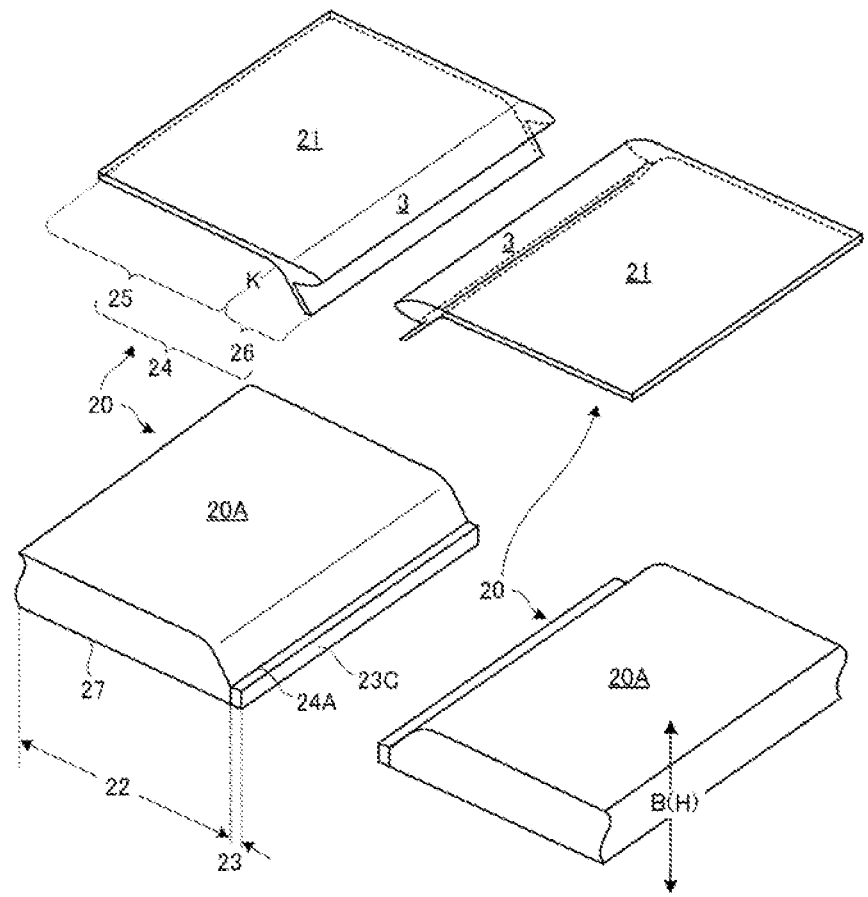
FIG. 1A is an exploded perspective view of a display device in a first embodiment of the present invention.
Figure 1B:
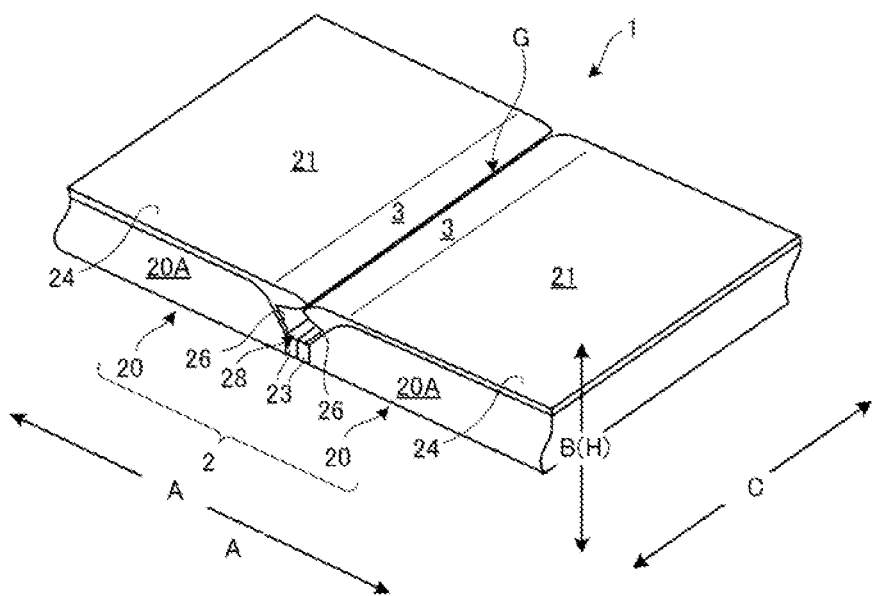
FIG. 1B is a perspective view of the display device in the first embodiment of the present invention.

Embodiments of the present invention will be described below with reference to the accompanying drawings. FIGS. 1 to 8 are examples of the embodiments of the invention, in which component members denoted by the same signs as those in FIGS. 1A and 1B represent the same component members.

First Embodiment

A display device 1 in a first embodiment of the present invention includes a display part 2, translucent parts 3, and a control part (not shown) that controls the display part 2 (display panel parts 20).

Display Part

The display part 2 includes at least two display panel parts 20 as shown in FIGS. 1A and 1B. The display panel parts 20 each displays an image under the control of the control part. Examples of the display panel parts 20 include liquid crystal panels and organic electroluminescent (EL) panels. The display panel parts 20 each include a display body part 20A and a plate-shaped cover part 21 provided on the surface of the display body part 20A. The display body part 20A displays an image. For example, in the case of a liquid crystal panel, the display body part 20A is constituted of a color filter, a liquid crystal layer, a polarization plate, a drive circuit, and the like. For example, in the case of an organic EL panel, the display body part 20A is constituted of an organic EL layer, a glass substrate, a drive circuit, and the like. The cover part 21 covers the surface of the display body part 20A. The cover part 21 is formed into a plate shape by a translucent material having translucency. Examples of the translucent material include transparent resins and glass. The cover part 21 may have a thickness that is uniform over the entire region or may have different thickness depending on the locations. The display panel parts 20 are assumed to be in square shapes in a plan view viewed from the side that faces a display surface 24. However, the shape of the display panel parts 20 are not limited thereto, and the display panel parts 20 may be in other shapes.

The display panel parts 20 each include a display region 22 and a non-display region 23. In the display region 22, an image is displayed through the display surface 24. The display surface 24 corresponds to the surface of the cover part 21. In the non-display region 23, no image is displayed. The non-display region 23 is adjacent to the display region 22. Specifically, the non-display region 23 is provided at the positions adjacent to display-side inclined surface part 26 described below. In the non-display region 23, a frame (bezel) of the display panel part 20 is provided, for example.

The display surface 24 of the display panel part 20 (the cover part 21) includes, as shown in FIG. 1A, a display-side flat surface part 25 and the display-side inclined surface part 26. The display-side flat surface part 25 is a flat portion that occupies most of the display surface 24. The display-side inclined surface part 26 constitutes at least part of an outer edge of the display surface 24. The display-side inclined surface part 26 is continuous with the display-side flat surface part 25, and is provided in a band-shaped region that extends along an outer edge 24A of the display surface 24 in the vicinity of the outer edge 24A. The display-side inclined surface part 26 is inclined from the display-side flat surface part 25 toward an opposite surface 27 (the back surface of the display panel part 20), which is provided opposite to the display-side flat surface part 25, while extending toward the outer edge 24A of the display surface 24. Specifically, the display-side inclined surface part 26 is inclined toward the opposite surface 27 (the back surface of the display panel part 20) opposite side to the display-side flat surface part 25 in a thickness direction B of the display panel part 20, while extending from a boundary K with the display-side flat surface part 25 as a starting point toward the side away from the display-side flat surface part 25 (the side closer to the non-display region 23). Hereinafter, the thickness direction B of the display panel part 20 is referred to as a display panel thickness direction B.

When the two display panel parts 20, as shown in FIG. 1B, are moved by a display panel part moving mechanism (not shown) such that the non-display regions 23 are closer to each other, the display panel parts 20 are arranged so as to be adjacent to each other in parallel, with the respective non-display regions 23 interposed between the respective display regions 22. In this state, the respective non-display regions 23 are interposed between the respective display regions 22, and longitudinal side surfaces 23C of the non-display regions 23 in the two display panel parts 20 face each other and are in contact with each other. The contact portion forms a boundary 23B between the adjacent non-display regions 23. As a result, in a joint G of the display panel parts 20, the display-side inclined surface parts 26 of the two display panel parts 20 face each other in an array direction A of the display panel parts 20. Between the respective display-side inclined surface parts 26, a gap region 28 is formed. The gap region 28, as shown as a region encircled with a dotted line in FIG. 2A, indicates a region surrounded with the display-side inclined surface parts 26 including virtual display-side inclined surface parts 26C (see a dotted line portion) continuous with the translucent parts 3, surfaces 23A of the non-display regions 23, and virtual extension surface parts 25A obtained by virtually extending the display-side flat surface parts 25. In the present embodiment, the translucent parts 3 are arranged entirely in the gap region 28. However, the arrangement is not limited to this configuration. The translucent parts 3 may be arranged at least partially in the gap region 28. For example, the translucent parts 3 may partially protrude from the gap region 28 toward an observer side. Hereinafter, the array direction A of the display panel parts 20 is referred to as display panel array direction A.

In the thus-configured display part 2 having two adjacent display panel parts 20, the display region 22 on one side may display one side of a continuous image, and the display region 22 on the other side may display the other side of the continuous image. Since the non-display regions 23 are located between the display regions 22, which correspond to the adjacent display panel parts 20, the continuous image is naturally displayed in a separated state. The translucent parts 3, which are described later, function as display auxiliary members so that the separated continuous image can be connected and displayed as a single continuous image.

Translucent Part

The translucent part 3 is configured with a translucent material having translucency. Examples of the translucent material include transparent resins and glass. In the present embodiment, the translucent part 3 is provided for each display panel part 20 as shown in FIGS. 1A and 1B. The translucent parts 3 in the present embodiment are formed and integrated with the cover parts 21.

Figure 2A:
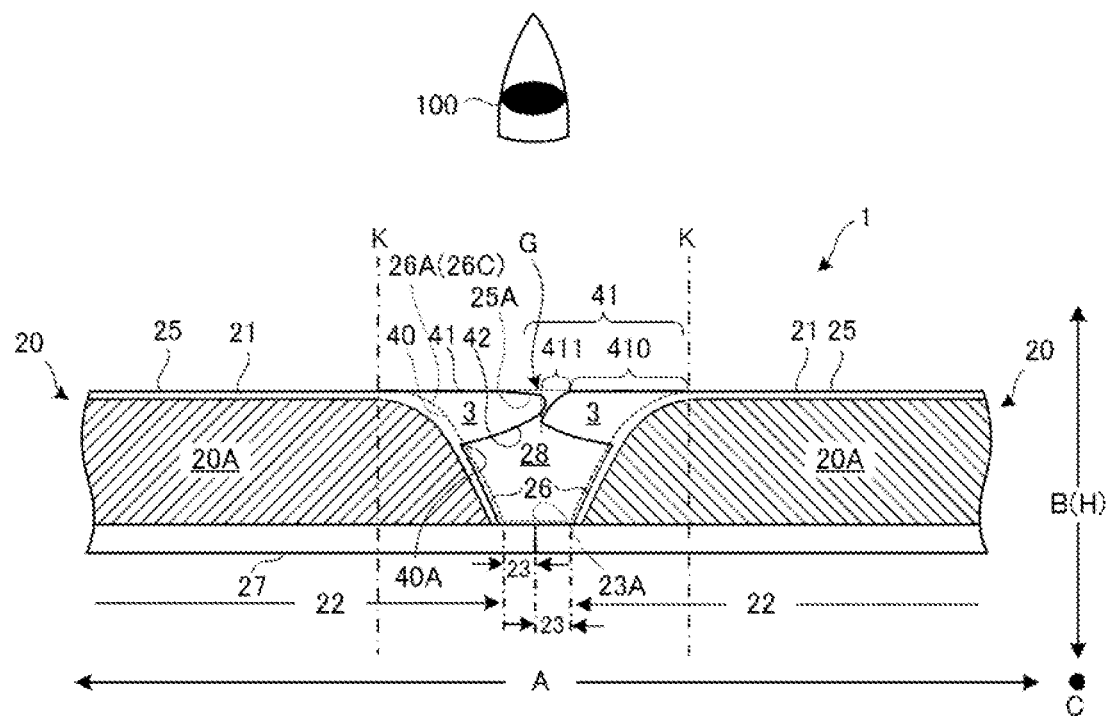
FIG. 2A is a cross-sectional view of the display device in the first embodiment of the present invention, in which the display device is cut in a thickness direction of the display panel parts along an array direction of the display panel parts.

The translucent parts 3 are each configured so as to protrude from the display-side inclined surface part 26 as a starting point in the gap region 28 toward the adjacent display panel part 20 along the display panel array direction A as shown in FIGS. 1B and 2A. The translucent parts 3 in the present embodiment are each configured to include a partial region protruding portion that protrudes from a partial region 26A (a virtual display-side inclined surface part 26C) of the display-side inclined surface part 26 as a starting point. Note that in the present embodiment, the partial region 26A (virtual display-side inclined surface part 26C) of the display-side inclined surface part 26 is continuous with the display-side flat surface part 25. In the present embodiment, the two translucent parts 3, which correspond to the respective adjacent display panel parts 20 are adjacent to each other and in parallel with the display panel array direction A in the gap region 28, and face each other in the display panel array direction A. Note that the partial region 26A of the display-side inclined surface part 26 may be not continuous with the display-side flat surface part 25, and may be a region away from the display-side flat surface part 25 toward a depth side (the side of the opposite surface 27) in the display panel thickness direction B. In that case, the translucent parts 3 protrude from a deeper side than the display-side flat surface part 25 in the display panel thickness direction B (the side of the opposite surface 27), as a starting point, and therefore a step is formed between the translucent part 3 and the display-side flat surface part 25. When the partial region 26A of the display-side inclined surface part 26 is continuous with the display-side flat surface part 25, the above-mentioned step is not formed, and as a result, an observer can see the display screen without any discomfort.

Figure 2B:
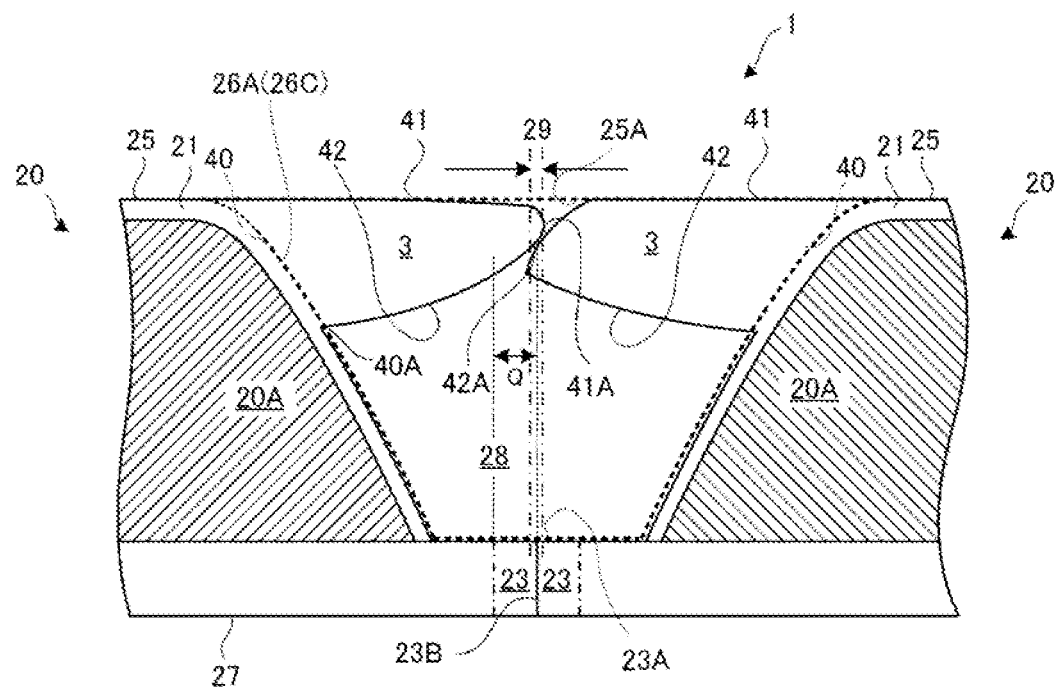
FIG. 2B is an enlarged view enlarging the vicinity of translucent parts in FIG. 2A.

The translucent parts 3 are each configured to include, as shown in FIGS. 2A and 2B, a segment where a cross section, cut in the display panel thickness direction B along the display panel array direction A, has a smaller area, or the cross section in the display panel thickness direction B has a smaller width of the cross section as it approaches the adjacent display panel part 20 along the display panel array direction A. One end of each segment constitutes a distal end of each of the translucent parts 3 in the protruding direction (display panel array direction A). Such translucent parts 3 each include a continuous part 40, an observer-side surface 41, and a non-observer-side surface 42. The continuous part 40 is part of the translucent part 3 which is continuous with the partial region 26A of the display-side inclined surface part 26 (the cover part 21). When the cross section of the display device 1, cut in the display panel thickness direction B along the display panel array direction A, is sectionally viewed from the joint extending direction C along the joint of the two display panel parts 20, the continuous parts 40 in the present embodiment are continuous with the partial regions 26A of the display-side inclined surface parts 26 as shown in FIG. 2A. The partial regions 26A of the display-side inclined surface parts 26 in the present embodiment are regions extending to the middle of the display-side inclined surface parts 26 from each boundary K between the display-side inclined surface part 26 and the display-side flat surface part 25, as a starting point. The partial regions 26A of the display-side inclined surface parts 26 may each be a middle region of the corresponding display-side inclined surface part 26, the middle region extending from a middle position of the display-side inclined surface part 26 that is deeper in the display panel thickness direction B than the boundary K as a starting point toward another midway position of the display-side inclined surface part 26 that is further deeper in the display panel thickness direction B. Since the translucent parts 3 are formed and integrated with the cover parts 21 in the present embodiment, the translucent parts 3 and the cover parts 21 are inseparable. However, the translucent parts 3 and the cover parts 21 may be configured as separable individual members as will be described later in <Second Embodiment>. In that case, the translucent parts 3 and the cover parts 21 are in contact with each other and are separably continuous.

Here, for the convenience of the following description, based on the positional relation in the case where an observer 100 sees the display device 1 from a surface-perpendicular direction H perpendicular to the display-side flat surface parts 25 of the display panel parts 20, the side approached from the display device 1 to the observer 100 in the surface-perpendicular direction H is defined as an observer side, and the side approached from the observer 100 to the display device 1, i.e., the side opposite to the observer side, is defined as a non-observer side. In the following description, the surface-perpendicular direction H perpendicular to the display-side flat surface parts 25 of the display panel parts 20 is simply referred to as display surface-perpendicular direction H. Since the display surface-perpendicular direction H in the present embodiment is parallel to the display panel thickness direction B, the definition of the observer side and the non-observer side are similarly applied to the display panel thickness direction B. The display surface-perpendicular direction H may also be read as the display panel thickness direction B as appropriate.

The observer-side surfaces 41 are the surfaces directed to the observer side and face the observer 100 in the display surface-perpendicular direction H. In the present embodiment, the observer-side surfaces 41 each extend toward the display panel part 20 (the translucent part 3) that is adjacent to the display panel part 20 corresponding to each of them from the boundary K between the display-side inclined surface part 26 and the display-side flat surface part 25 of the display surface 24 as a starting point.

The observer-side surfaces 41 in the present embodiment each include a parallel surface part 410 and an inclined surface part 411, as shown in FIG. 2A. The parallel surface parts 410 each extend toward the display panel part 20 (the translucent part 3) that is adjacent to the display panel part 20 corresponding to each of them so as to be continuous with the display-side flat surface part 25 of the display surface 24 and in parallel with the display-side flat surface part 25. As a result, the parallel surface parts 410 are flush with the display-side flat surface parts 25 of the display surfaces 24. Note that the parallel surface parts 410 may be located on the non-observer side in the display panel thickness direction B than the display-side flat surface parts 25 of the display surfaces 24. In other words, the observer-side surfaces 41 may be located on the same position as the display-side flat surface parts 25 of the display surfaces 24 or located on the non-observer side than the display-side flat surface parts 25 of the display surfaces 24 in the display panel thickness direction B.

The inclined surface parts 411 are each constituted of a curved surface that is continuous with the parallel surface part 410 and that is inclined with respect to the display-side flat surface part 25 of the display surface 24 or the parallel surface part 410. When the cross section of the display device 1, cut in the display panel thickness direction B along the display panel array direction A, is sectionally viewed as shown in FIG. 2A, the inclined surface parts 411 of the two adjacent observer-side surfaces 41 in the present embodiment are inclined so as to be directed to the non-observer side in the display panel thickness direction B while extending from the corresponding display panel part 20 to the adjacent display panel part 20 along the display panel array direction A.

The non-observer-side surfaces 42 are directed to the non-observer side in the display surface-perpendicular direction H. The non-observer-side surfaces 42 extend toward the display panel part 20 (the translucent part 3) that is adjacent to each display panel part 20 corresponding to each of them, from respective edges 40A of the continuous parts 40, which are distal from the observer 100 in the display surface-perpendicular direction H, as starting points. When the cross section of the display device 1, cut in the display panel thickness direction B along the display panel array direction A, is sectionally viewed, the two adjacent non-observer-side surfaces 42 in the present embodiment are inclined, as shown in FIG. 2A, so as to be directed to the observer side in the display panel thickness direction B (the display surface-perpendicular direction H) while extending from the corresponding display panel part 20 to the adjacent display panel part 20 along the display panel array direction A. The non-observer-side surfaces 42 in the present embodiment are each constituted of a protruding curved surface protruding to the outside. However, the non-observer-side surfaces 42 are not limited thereto, and may each be constituted of a recessed curved surface that is recessed toward the inside, or a flat surface. Moreover, the non-observer-side surfaces 42 each have, as shown in FIG. 2B, an overlap region Q that faces and overlaps with the entire non-display region 23 in the display panel thickness direction B (the display surface-perpendicular direction H). This can hide at least part of the non-display regions 23 from the observer 100.

The inclined surface parts 411 of the observer-side surfaces 41 and at least part of the non-observer-side surfaces 42 are inclined as described above. These inclined surfaces, which are the inclined surfaces in the translucent parts 3 (hereinafter, referred to as translucent-side inclined surfaces as appropriate), can each refract or reflect light from an image displayed on one display-side inclined surface part 26 corresponding thereto so as to shift the image to the other adjacent display-side inclined surface part 26 side (non-display region 23 side). When the translucent-side inclined surfaces include a protruding curved surface in particular, the translucent-side inclined surfaces serve as a magnifying and shifting lens. In other words, when the observer 100 sees the observer-side surfaces 41 in the display surface-perpendicular direction H at a position facing the translucent parts 3, an image displayed on one display-side inclined surface part 26 appears as if being shifted to the adjacent other display-side inclined surface part 26 side. In the case where the degree of shift is very small, the image displayed on one display-side inclined surface part 26 may appear as if the image is floating in the display surface-perpendicular direction H without being shifted and is displayed on the observer-side surface 41, when the observer 100 sees in a plan view the display surfaces 24 in the display surface-perpendicular direction H.

While the translucent-side inclined surfaces are at least partially arranged in the gap region 28, it is preferable that the translucent-side inclined surfaces be arranged in the gap region 28 in its entirety in particular. In addition, the translucent-side inclined surfaces serving as the non-observer-side surfaces 42 may each preferably include an overlap region Q that faces and overlaps with a region of the display-side inclined surface part 26 located on the non-observer side than the continuous part 40 (the edge 40A) in the display panel thickness direction B, or the non-observer-side surface 23.

The two adjacent translucent parts 3 in the present embodiment have, as shown in FIG. 2B, an overlap region 29 where the two adjacent translucent parts 3 overlap as viewed from the display surface-perpendicular direction H (display panel thickness direction B). Therefore, the observer-side surface 41 of one translucent part 3 extends so as to enter the lower side of the non-observer-side surface 42 of the other translucent part 3 (on the non-observer side in the display panel thickness direction B). At the time, a portion 41A of the observer-side surface 41 of one translucent part 3 is located on the non-observer side in the display panel thickness direction B than a portion 42A of the non-observer-side surface 42 of the other translucent part 3, and has an overlap region (corresponding to the overlap region 29) that faces and overlaps with the portion 42A of the non-observer-side surface 42 of the other translucent part 3 in the display panel thickness direction B (the display surface-perpendicular direction H). This allows an area that is located on the non-observer side in the display panel thickness direction B than the translucent parts 3 to be invisible to the observer 100. Note that it is naturally preferable that the two adjacent translucent parts 3 not be in contact with each other. This absence of contact serves to prevent the translucent parts 3 from being damaged.

The overlap region 29 also overlaps with the non-display regions 23 as seen in the display surface-perpendicular direction H (the display panel thickness direction B) as shown in FIG. 2B. In other words, as seen in the display surface-perpendicular direction H (the display panel thickness direction B), the non-observer-side surfaces 42 each have a region overlapped with the non-display region 23. Hence, the two non-display regions 23 are not seen through a gap between the two adjacent translucent parts 3 in the display surface-perpendicular direction H (the display panel thickness direction B). Furthermore, the overlap region 29 extends over a boundary 23B between the adjacent non-display regions 23, as seen in the display surface-perpendicular direction H (the display panel thickness direction B). Note that the overlap region 29 may be configured so as not to extend over the boundary 23B.

Modifications of Translucent Parts

As shown in FIGS. 3 and 4, the translucent parts 3 may be configured to contain aspects different from that described above, in which the observer-side surfaces 41 and the non-observer-side surfaces 42 are constituted of curved surfaces, flat surfaces, or a mixture of curved surfaces and flat surfaces. In such cases, the translucent parts 3 are also each configured to include a segment where a cross section, cut in the display panel thickness direction B along the joint extending direction C extending along the joint between the two display panel parts 20, has a smaller area, or the cross section in the display panel thickness direction B has a smaller width as it approaches the adjacent display panel part 20 along the display panel array direction A. One end of each segment is a distal end of each of the translucent parts 3 in the protruding direction (display panel array direction A).

In the above-described translucent parts 3, as shown in FIGS. 2A and 2B, the observer-side surfaces 41 are each constituted of a flat surface (the parallel surface part 410) and a curved surface in a protruding curved shape (the inclined surface part 411). However, as shown in the translucent part 3 on the left side in FIG. 3A and the translucent parts 3 on both the right and left sides in FIG. 3B, for example, the observer-side surface 41 may be constituted of only the parallel surface part 410 continuous with the display-side flat surface part 25 of the display surface 24 in the display panel part 20. Moreover, as shown in the translucent parts 3 on both the right and left sides in FIG. 4A, the observer-side surfaces 41 may each be constituted of only the inclined surface part 411 that is continuous with the display-side flat surface part 25 of the display surface 24 in the display panel part 20. Moreover, as shown in the translucent part 3 on the right side in FIG. 3A and the translucent part 3 on the right side in FIG. 3C, the observer-side surface 41 may be constituted of the parallel surface part 410 continuous with the display-side flat surface part 25 of the display surface 24 in the display panel part 20 and the flat-shaped inclined surface part 411 continuous with the parallel surface part 410. The inclined surface part 411 of the observer-side surface 41, shown in the translucent part 3 on the right side in FIG. 3A and in the translucent part 3 on the right side in FIG. 3C, is inclined so as to be directed to the non-observer side in the display panel thickness direction B, while extending from the corresponding display panel part 20 to the adjacent display panel part 20 along the display panel array direction A. Such inclined surface parts 411 in the translucent parts 3 are also included in the scope of the present invention. Note that the translucent parts 3 on the right and left sides in FIG. 4 B are each constituted of a flat surface (the parallel surface part 410), and an inclined surface in a protruding curved shape (the inclined surface part 411 in the protruding curved shape) like the translucent parts 3 shown in FIGS. 2A and 2B.

In the above description, as shown in FIGS. 2A and 2B, the non-observer-side surfaces 42 are each constituted of an inclined surface in a protruding curved shape that is continuous with the continuous part 40. However, as shown in the translucent parts 3 on both the right and left sides in FIG. 3A, for example, the non-observer-side surfaces 42 may each be constituted of only a flat-shaped inclined surface (the inclined surface part 421) that is continuous with the continuous part 40. Moreover, as shown in the translucent part 3 on the right side in FIG. 3C, the non-observer-side surface 42 may be constituted of only a flat surface (the parallel surface part 420) that is continuous with the continuous part 40 and extends from the corresponding display panel part 20 toward the adjacent display panel part 20 and in parallel with the display-side flat surface part 25 of the display surface 24 in the display panel part 20. Moreover, as shown in the translucent parts 3 on both the right and left sides in FIG. 3B, the translucent part 3 on the left side in FIG. 3C, and the translucent parts 3 on both the right and left sides in FIG. 4A, the non-observer-side surfaces 42 may each be constituted of a flat surface (the parallel surface part 420) that is continuous with the continuous part 40 and extends from the corresponding display panel part 20 toward the adjacent display panel part 20 and in parallel with the display-side flat surface part 25 of the display surface 24 in the display panel part 20, and an inclined surface (the inclined surface part 421) in a flat shape or a protruding curved shape continuous with the flat surface. As shown in the translucent parts 3 on both the right and left sides in FIG. 4B, the non-observer-side surfaces 42 may each be constituted of a flat-shaped inclined surface in a flat shape (a flat-shaped inclined surface part 421A) continuous with the continuous part 40 and a recessed curved surface-shaped inclined surface in a recessed curved surface shape (a recessed curved surface-shaped inclined surface part 421B) continuous with the flat-shaped inclined surface (the flat-shaped inclined surface part 421A). The protruding curved surfaces described above are curved surfaces protruding to the outside of the translucent parts 3, and the recessed curved surfaces are curved surfaces recessed toward the inside of the translucent parts 3. The translucent parts 3 on both the right and left sides in FIG. 4B each have a lens 31 in a segment including the distal end of the translucent part 3 in the protruding direction (the display panel array direction A). The lens 31 has an inclined surface in the protruding curved surface shape on the observer side (one surface side) and an inclined surface in the recessed curved surface shape orthogonal to the inclined surface in the protruding curved surface shape at the distal end of the translucent part 3 on the non-observer side (an opposite surface side opposite to the one surface). According to the lens, parallax can be reduced, and the thickness of the lens can be reduced while increasing the magnification factor toward the distal end.

Figure 3A:
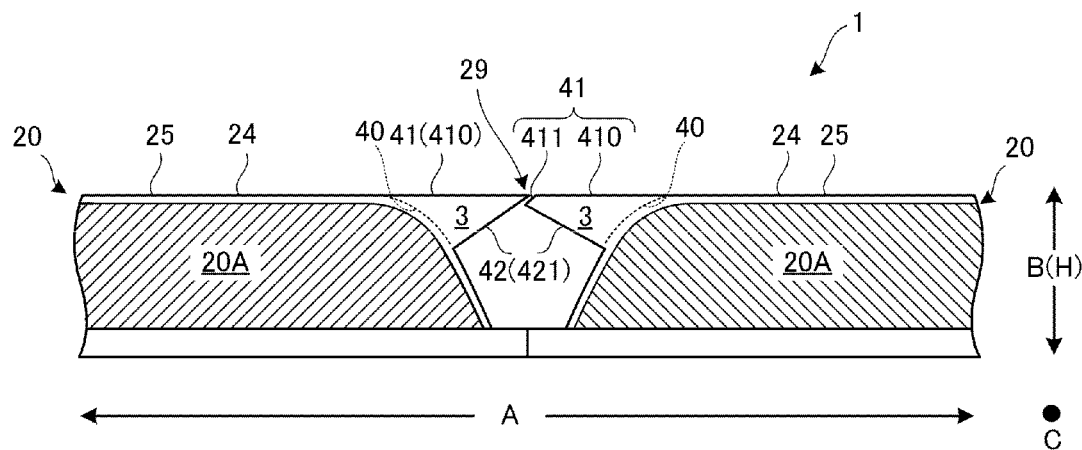
FIGS. 3A to 3C are cross-sectional views of modifications of the display device in the first embodiment of the present invention, in which the respective display devices are cut in the thickness direction of the display panel parts along the array direction of the display panel parts.
Figure 3B:
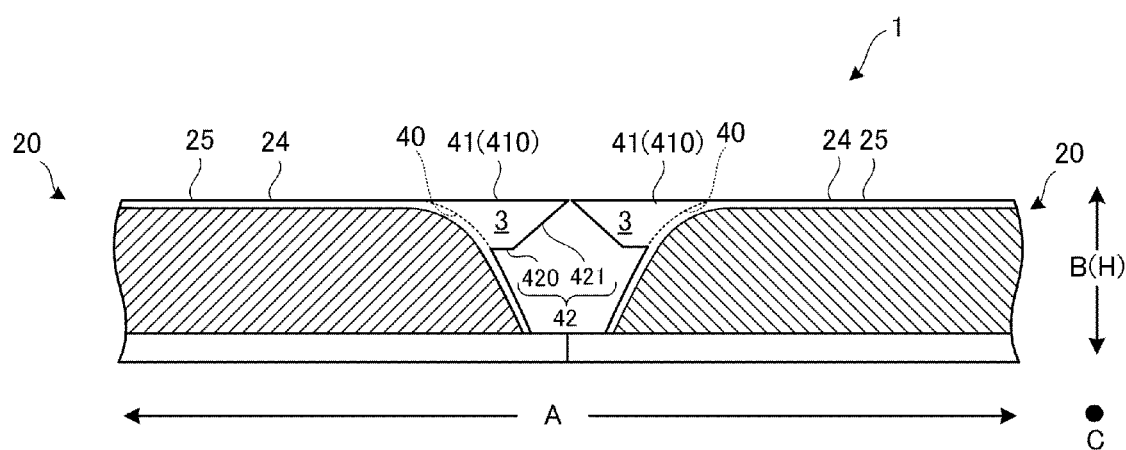
Figure 3C:
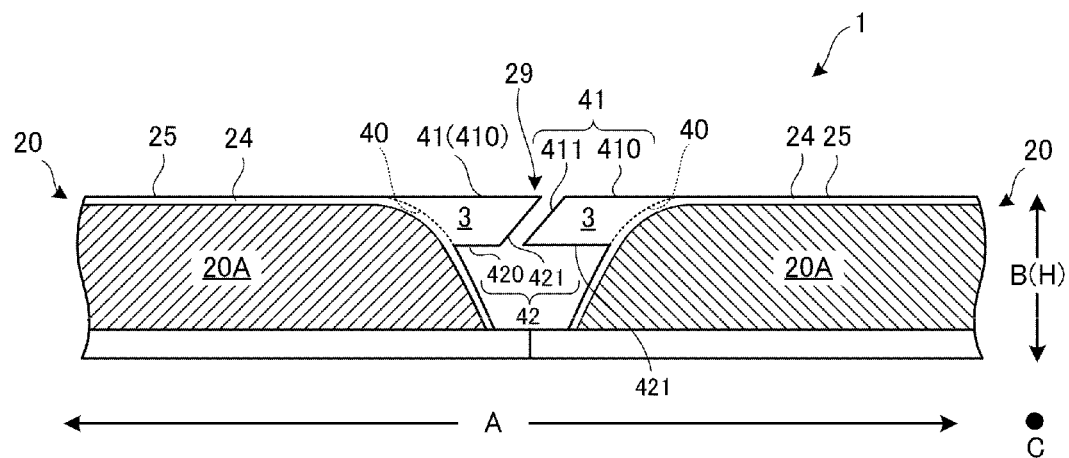
Figure 4A:
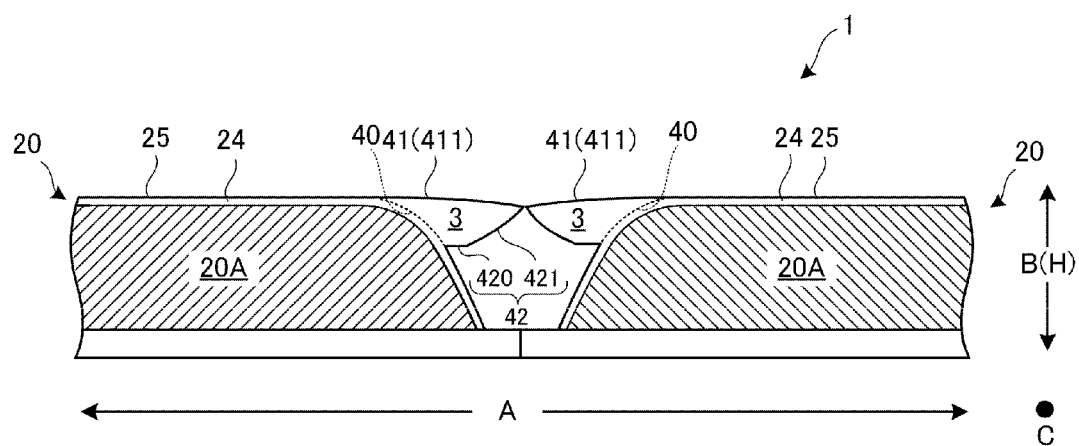
FIGS. 4A and 4B are cross-sectional views of modifications of the display device in the first embodiment of the present invention, in which the respective display devices are cut in the thickness direction of the display panel parts along the array direction of the display panel parts.
Figure 4B:
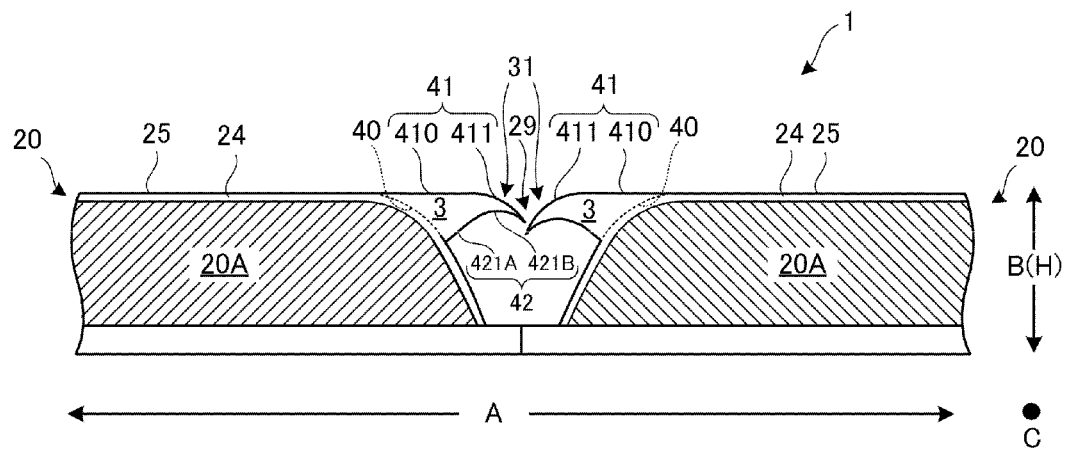

The two adjacent translucent parts 3 shown in FIGS. 3A, 3C and 4B have an overlap region 29 where the two adjacent translucent parts 3 overlap with each other in the display surface-perpendicular direction H (display panel thickness direction B). When the overlap region 29 is provided, it is naturally preferable that the two adjacent translucent parts 3 be not in contact with each other. On the other hand, the two adjacent translucent parts 3 shown in FIGS. 3B and 4A do not have the overlap region 29 where the two adjacent translucent parts 3 overlap with each other. Such aspects are also included in the scope of the present invention. When the two adjacent translucent parts 3 do not have the overlap region 29, the two adjacent translucent parts 3 may be configured to be in contact with each other at their distal ends so as to hide the non-display regions 23. However, in view of reducing the risk of damage, the two adjacent translucent parts 3 may be configured to avoid contact with each other.

In addition, all of the above-described combinations of the observer-side surface 41 and the non-observer-side surface 42 are included in the scope of the present invention. The translucent parts 3 move an image displayed on the display-side inclined surface parts 26 corresponding to one of them so that the image floats up to the observer-side surfaces 41. At the time, the translucent-side inclined surfaces shift the image partially displayed on one display-side inclined surface part 26 to the other display-side inclined surface part 26 side (the non-display region 23 side). The degree of shift distance depends on the positional relation between the display-side inclined surface parts 26 and the translucent-side inclined surfaces, the relative inclination angle, the size, and the like. According to the aspect of the translucent-side inclined surfaces of the translucent parts 3, the translucent parts 3 may each be configured as a convex lens that magnifies and shifts at least part of an image and moves the image so as to float up to the observer-side surfaces 41. The translucent parts 3 may also each be configured as a prism that simply shifts part of an image and moves the image so as to float up to the observer-side surfaces 41, or configured as a member that moves at least part of an image so as to float up to the observer-side surfaces 41 without hardly shifting the image. As a result, images displayed on the display-side inclined surface parts 26, which are hardly visible to the observer 100 in the display surface-perpendicular direction H (the display panel thickness direction B), can be converted to images visible to the observer 100 at the joint of the two adjacent display panel parts 20 corresponding to the non-display regions 23.

When the translucent parts 3 function as a convex lens or a prism in particular, one translucent part 3 can shift one side of a continuous image displayed on the corresponding display-side inclined surface part 26 to the other display-side inclined surface part 26 side (the non-display region 23 side). The other translucent part 3 can shift the other side of the continuous image displayed on the corresponding display-side inclined surface part 26 to the one display-side inclined surface part 26 (the non-display region 23). This allows a continuous image separated by the non-display regions 23 to be displayed to the observer 100 as a connected continuous image due to the translucent parts 3 shifting the image to the non-display regions 23.

As shown in FIGS. 2A and 2B, FIGS. 3A to 3C, and FIGS. 4A and 4B, the observer-side surfaces 41 are preferably located at the same position as that of the display-side flat surface parts 25 of the display surfaces 24 in the display panel parts 20 in the display surface-perpendicular direction H (the display panel thickness direction B), or at the position on the non-observer side than the display-side flat surface parts 25 of the display surfaces 24 in the display panel parts 20. As a result, the translucent parts 3 have no portion protruding toward the observer side from the display-side flat surface parts 25 of the display surfaces 24 in the display panel parts 20. However, the translucent parts 3 is not limited to the above configuration, and the observer-side surfaces 41 may be located at the position on the observer side than the display-side flat surface parts 25 of the display surfaces 24 in the display panel parts 20. In this case, it is preferable that the translucent parts 3 have a portion protruding from the display-side flat surface parts 25 of the display surfaces 24 in the display panel parts 20 toward the observer side, with the protruding portion being minimized. With such configuration of the translucent parts 3, the observer 100 recognizes that the display region 22 is extended to the gap region 28 of the display part 2, and the non-display regions 23 are reduced or disappear. As a result, for the observer 100, the joint between the two display panel parts 20 becomes almost unnoticeable, and the display part 2 is allowed to be seen as if being constituted of a single display panel part 20.

Second Embodiment

Figure 5A:
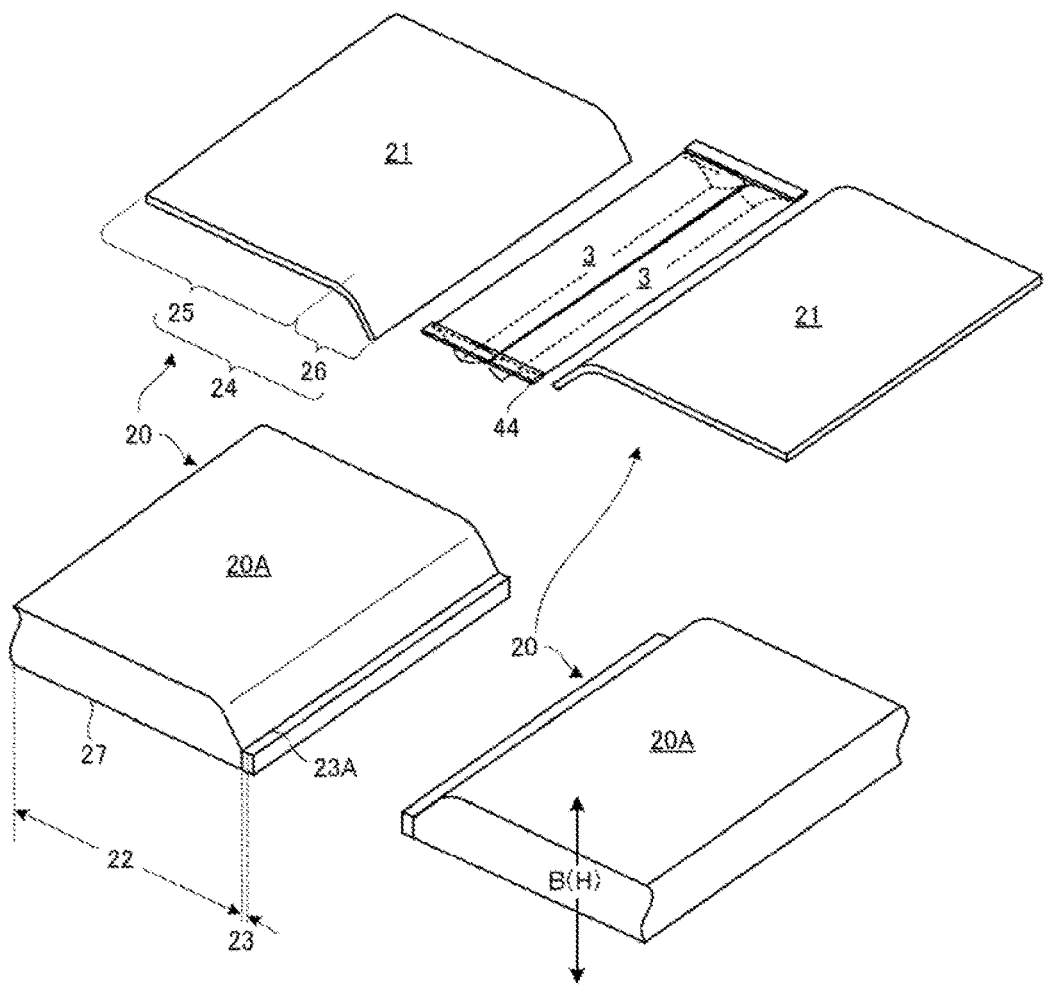
FIG. 5A is an exploded perspective view of a display device in a second embodiment of the present invention.
Figure 5B:
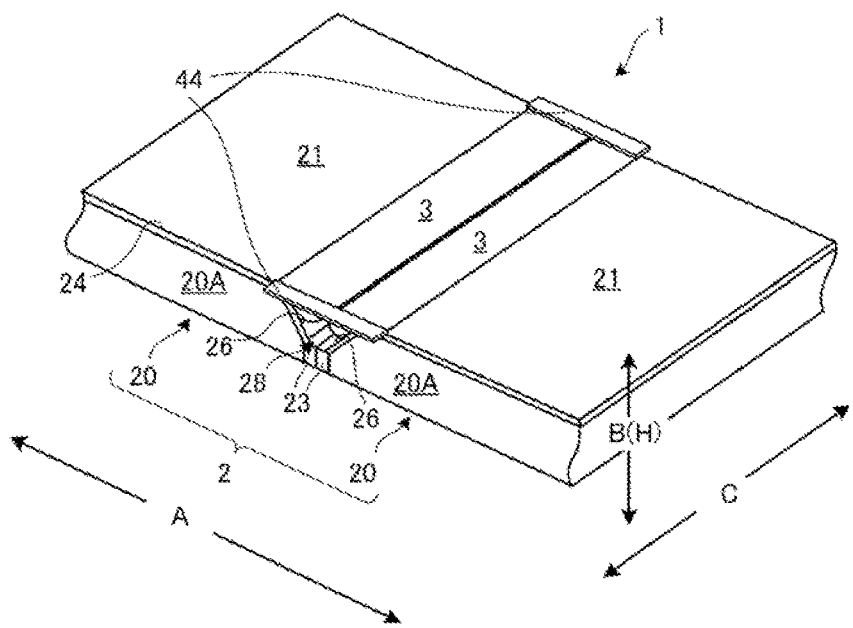
FIG. 5B is a perspective view of the display device in the second embodiment of the present invention.

As shown in FIGS. 5A and 5B, the display device 1 in a second embodiment of the present invention includes the display part 2, the translucent parts 3, and the control part (not shown) as in the case of the first embodiment. The second embodiment is different from the first embodiment in that the cover parts 21 and the translucent parts 3 are configured as separate members.

Figure 6:
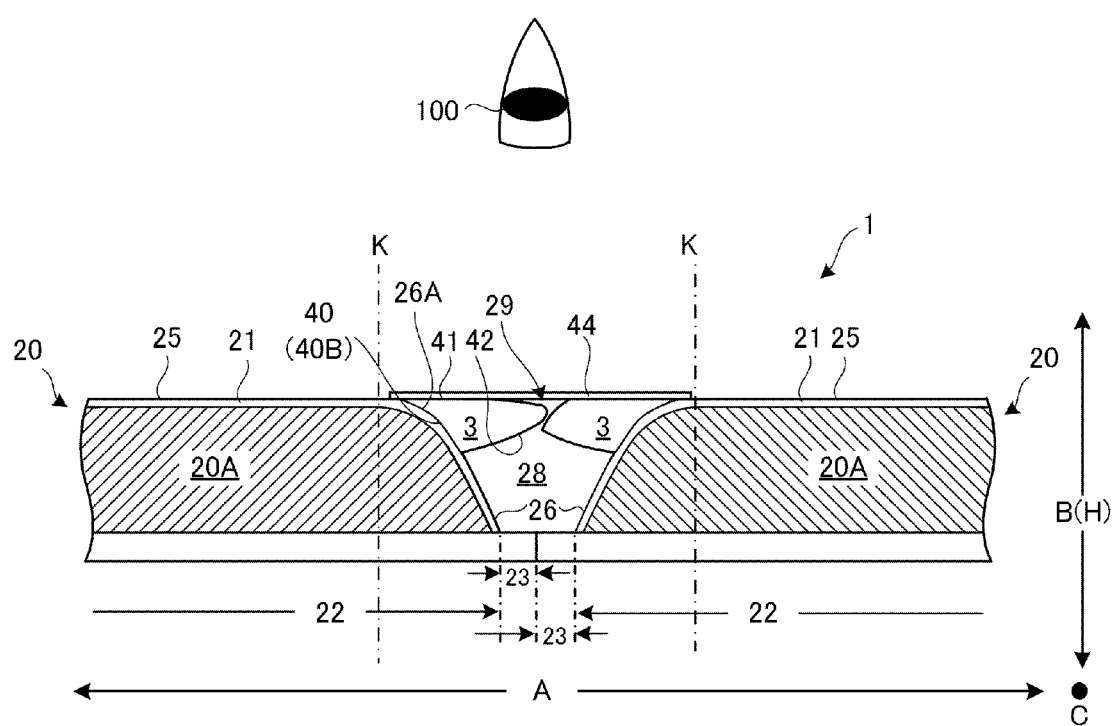
FIG. 6 is a cross-sectional view of the display device in the second embodiment of the present invention, in which the display device is cut in the thickness direction of the display panel parts along the array direction of the display panel parts.

The translucent parts 3 in the present embodiment are mounted on the display-side inclined surface parts 26 of the display panel parts 20 (the cover parts 21). The continuous parts 40 of the translucent parts 3 in the present embodiment have a shape along the partial regions 26A of the display-side inclined surface parts 26, and are configured as continuous surfaces 40B as shown in FIG. 6. Therefore, when the translucent parts 3 are mounted on the display-side inclined surface parts 26, the continuous surfaces 40B (the continuous parts 40) entirely come into contact with the partial regions 26A of the display-side inclined surface parts 26, and continue to the partial regions 26A of the display-side inclined surface parts 26. However, the present invention is not limited to this configuration, and the continuous surfaces 40B (the continuous parts 40) may come into contact with further part of the partial regions 26A of the display-side inclined surface parts 26, and may not come into contact with other parts of the partial regions 26A. Accordingly, a gap may be formed between the continuous surfaces 40B (the continuous parts 40) and the partial regions 26A of the display-side inclined surface parts 26.

The two adjacent translucent parts 3 in the present embodiment may be coupled by coupling parts 44 in the state of being in a relative posture and a relative position so as to have an overlap region 29 where the two adjacent translucent parts 3 overlap in the display surface-perpendicular direction H (the display panel thickness direction B) as shown in FIG. 6. In this case, it is preferable that the two adjacent translucent parts 3 are not in contact with each other. The coupling parts 44 are each constituted of, for example, a coupling body in a plate shape or a rod shape or the like, and a fixing part that fixes the two translucent parts 3 and the coupling body (e.g., screws, adhesives, and thermal fusing). The coupling body and the adjacent two translucent parts 3 are coupled preferably at end parts of the two adjacent translucent parts 3 in a longitudinal direction or in the vicinity thereof as shown in FIG. 5A. With such a configuration, the two adjacent translucent parts 3 are retained in the gap region 28 between the adjacent display panel parts 20, as in the case of the first embodiment. The positions where the coupling bodies are fixed to the two translucent parts 3 are not limited to the above-mentioned positions, and the coupling bodies may be fixed at any position.

In the present embodiment, the translucent parts 3 are separate members from the cover parts 21. Therefore, the effect described in the first embodiment can be obtained by simply installing, for the display device 1 having the gap region 28 between the adjacent display panel parts 20, the translucent parts 3 in the gap region 28.

In the present embodiment, as in the first embodiment, the translucent parts 3 as described in <Modifications of Translucent Parts> can also be applied. Such modifications are also included in the scope of the present invention.

Third Embodiment

Figure 7A:
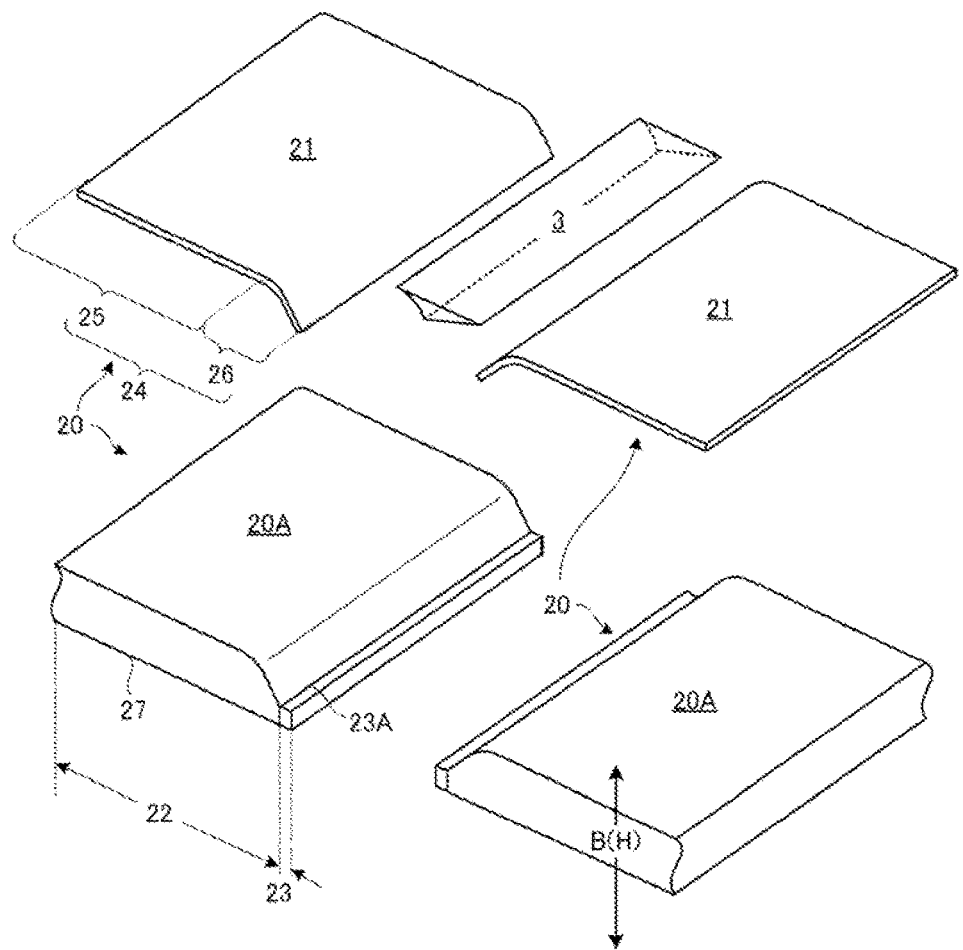
FIG. 7A is an exploded perspective view of a display device in a third embodiment of the present invention.
Figure 7B:
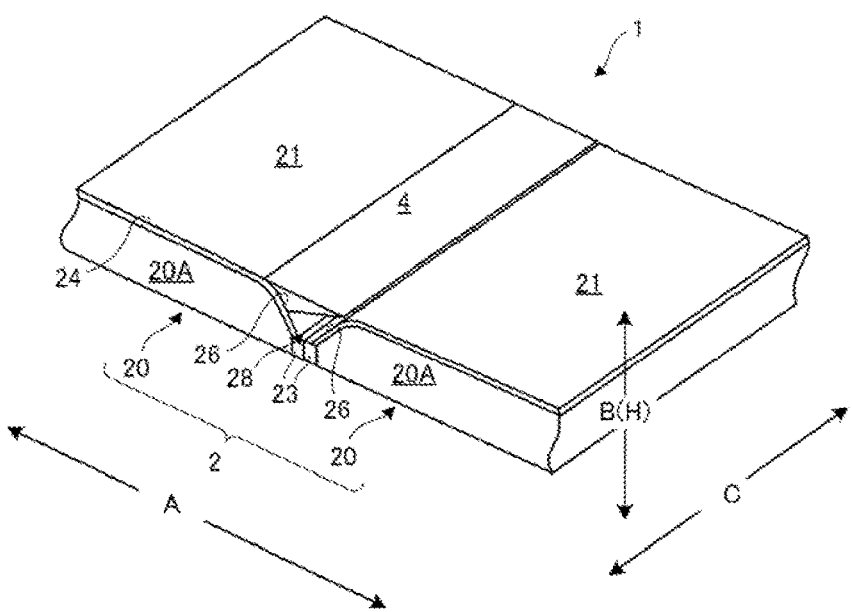
FIG. 7B is a perspective view of the display device in the third embodiment of the present invention.

The display device 1 in a third embodiment of the present invention includes the display part 2, the translucent part 3, and the control part (not shown) as in the case of the first and second embodiments. In the second embodiment, the translucent part 3 is provided for each of the two adjacent display panel parts 20. As a result, two translucent parts 3 are provided in the display panel array direction A. In the present embodiment, there is one translucent part 3 provided between the two adjacent display panel parts 20 in the display panel array direction A, as shown in FIGS. 7A and 7B. Note that two or more translucent parts 3 may be arranged in the joint extending direction C.

Figure 8:
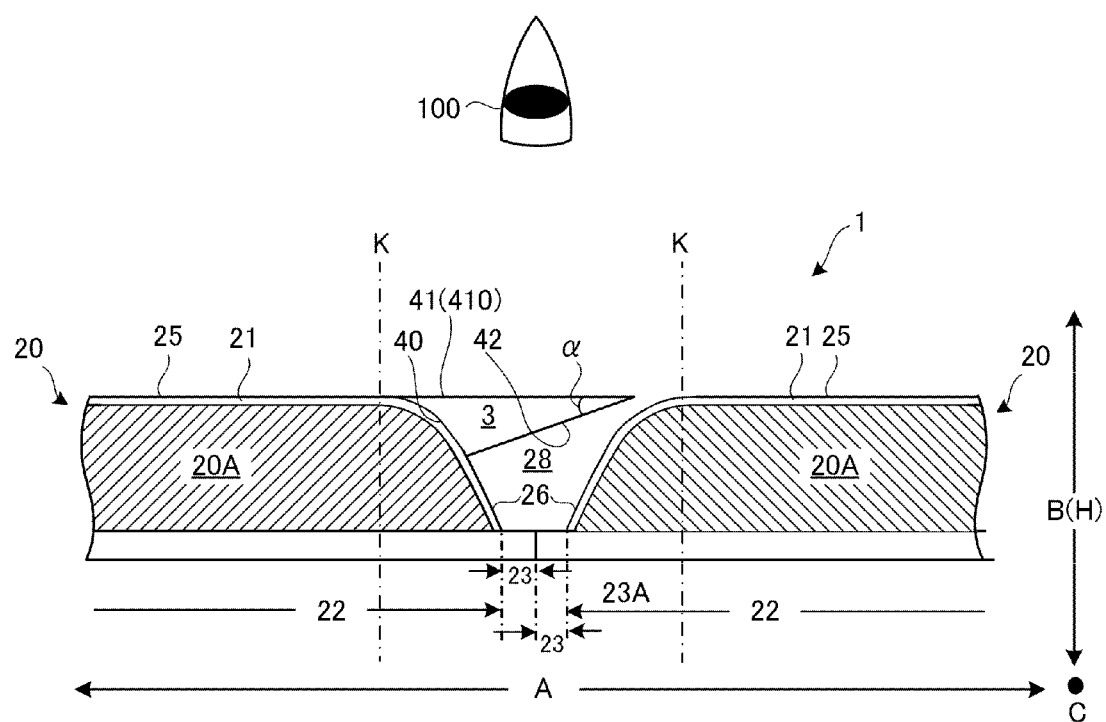
FIG. 8 is a cross-sectional view of the display device in the third embodiment of the present invention, in which the display device is cut in the thickness direction of the display panel parts along the array direction of the display panel parts.

As shown in FIG. 8, the translucent part 3 in the present embodiment is an aspect formed by extending the translucent part 3, corresponding to one display panel part 20 in the first and second embodiments, toward the other display panel part 20 along the display panel array direction A. The non-observer-side surface 42 is inclined to have an inclination angle α with respect to the observer-side surface 41 (the parallel surface part 410). The translucent part 3 in the present embodiment extends up to the position overlapped with the display-side inclined surface part 26 of the other display panel part 20 as seen from the display surface-perpendicular direction H (the display panel thickness direction B). This is for hiding at least part of the non-display regions 23 from the observer 100. In this case, the translucent part 3 has a region that faces and overlaps with the display-side inclined surface part 26 of the other display panel part 20 in the display surface-perpendicular direction H (the display panel thickness direction B). Note that the translucent part 3 preferably extends to a boundary K between the display-side flat surface part 25 and the display-side inclined surface part 26 of the other display panel part 20 or to the vicinity thereof as shown by an alternate long and short dash line N in FIG. 9A. In order to prevent damage to the translucent part 3 and the display panel parts 20, it is preferable that the translucent part 3 and the display-side inclined surface parts 26 be not in contact with each other. However, the configuration where the translucent part 3 and the display-side inclined surface parts 26 are in contact with each other is also included in the present invention. In the present embodiment, the translucent part 3 is provided as a separate member from the cover part 21. However, the present invention is not limited thereto, and the translucent part 3 may be formed and integrated with the cover part 21.

Figure 9A:
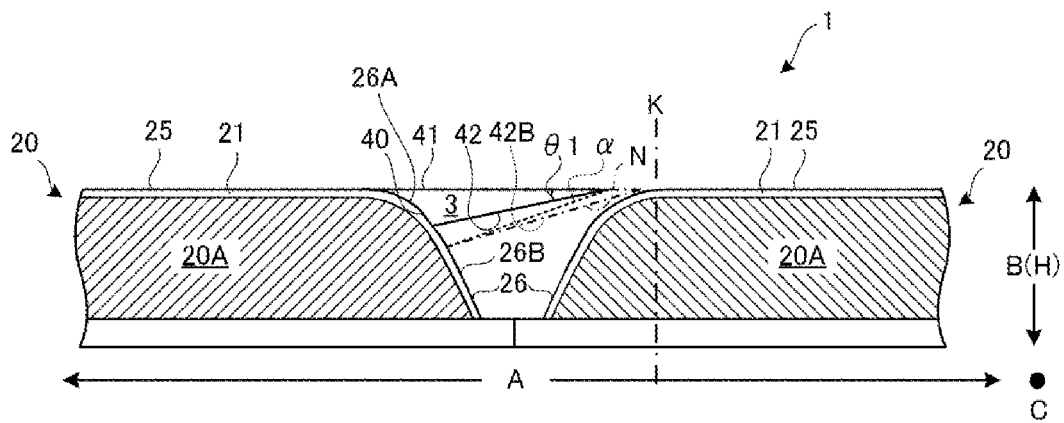
FIGS. 9A to 9C are cross-sectional views of modifications of the display device in the third embodiment of the present invention, cut in the thickness direction of the display panel parts along the array direction of the display panel parts.
Figure 9B:
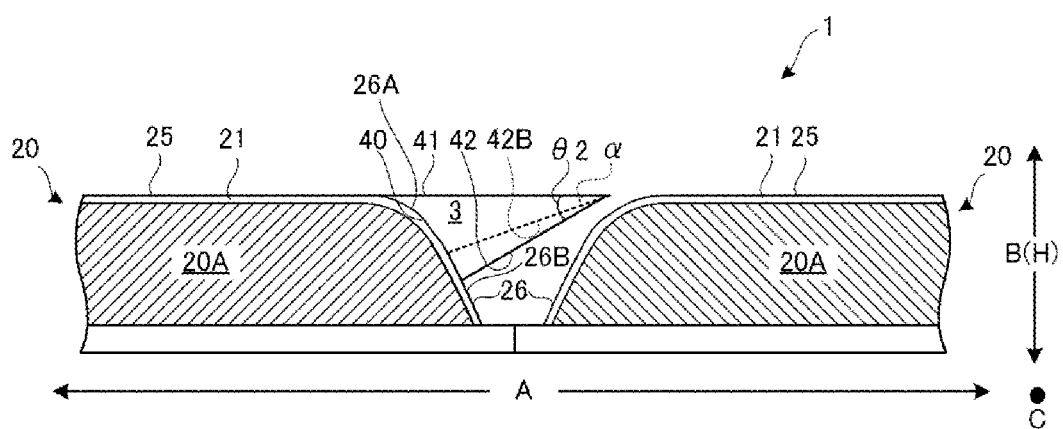
Figure 9C:
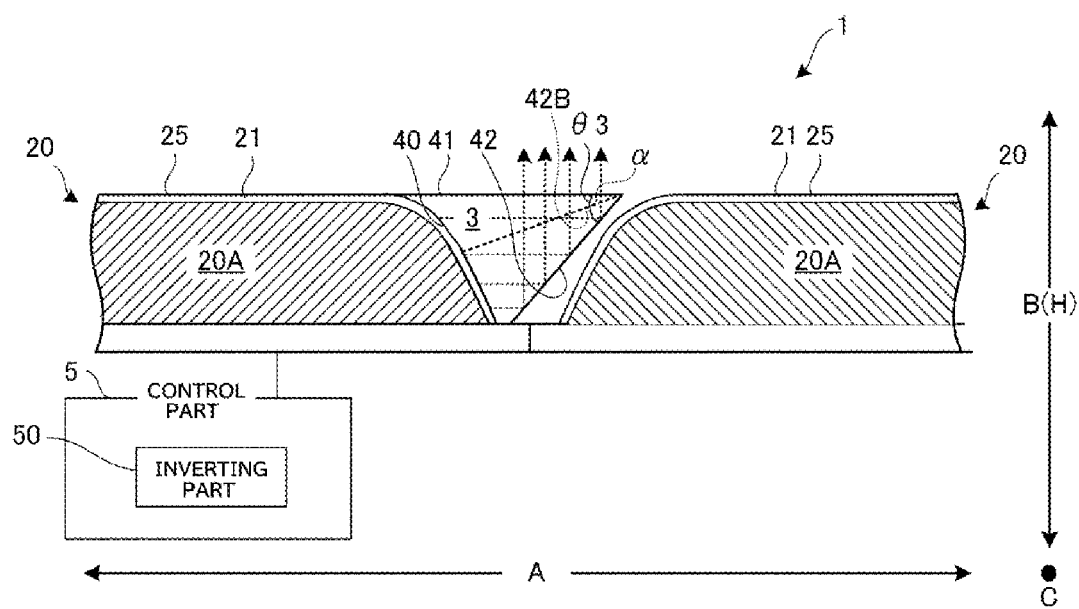

As shown in FIGS. 9A to 9C, the non-observer-side surfaces 42 having various inclinations are assumed. When the non-observer-side surface 42 having an inclination angle α is virtually defined as a virtual non-observer-side surface 42B, based on the observer-side surface 41 formed of the parallel surface part 410 that extends up to the position overlapped with the display-side inclined surface part 26 of the other display panel part 20, the non-observer-side surface 42 may have an inclination angle θ1 that is smaller than the inclination angle α as shown in FIG. 9A. As shown in FIG. 9B, the non-observer-side surface 42 may also have an inclination angle θ2 that is larger than the inclination angle α. Furthermore, as shown in FIG. 9C, the non-observer-side surface 42 may have an inclination angle θ3 that is larger than the inclination angle θ2.

As described in the foregoing, when the non-observer-side surface 42 has an inclination angles θ1 and θ2, the translucent part 3 protrudes from the partial region 26A of the display-side inclined surface part 26 as a starting point, as shown in FIGS. 9A and 9B. When the non-observer-side surface 42 has an inclination angle θ3, the translucent part 3 protrudes from the entire region of the display-side inclined surface part 26 as a starting point, as shown in FIG. 9C. The portion of the entire region is referred to as an entire region protruding portion in contrast to the partial region protruding portion.

Incidentally, light from the side of an image, displayed on the display-side inclined surface part 26, refracts, reflects, or travels straight, depending on the angle of incidence on the translucent part 3 that is different in refractive index, and propagates to the observer side. At this point, the light passing through the observer-side surface 41 and traveling in the display surface-perpendicular direction H is recognized by the observer 100 as an image. As shown in FIGS. 9A and 9B, when, for example, there is a remaining region 26B other than the partial region 26A in the display-side inclined surface part 26, a space is present between the remaining region 26B and the translucent part 3. Light from the remaining region 26B is incident on the translucent-side inclined surface (the non-observer-side surface 42) from the outside of the translucent part 3 through the space, and the light refracts and propagates to the observer side. At this point, the light passing through the observer-side surface 41 and traveling in the display surface-perpendicular direction H is recognized by the observer 100 as an image. The light from the partial region 26A of the display-side inclined surface part 26 is reflected by the translucent-side inclined surface (the non-observer-side surface 42) from the inside of the translucent part 3. The reflected light then passes through the observer-side surface 41 and travels in the display surface-perpendicular direction H, or travels straight to the observer-side surface 41, passes through the observer-side surface 41, and travels in the display surface-perpendicular direction H. When the light from the partial region 26A of the display-side inclined surface part 26 is reflected, and the reflected light passes through the observer-side surface 41 and travels in the display surface-perpendicular direction H, an image displayed on the partial region 26A of the corresponding display-side inclined surface part 26 is recognized by the observer 100 as an inverted image. As shown in FIG. 9C, when, for example, the entire region of the display-side inclined surface part 26 is a starting point of the translucent part 3, the light from the entire region of the display-side inclined surface part 26 is reflected by the translucent-side inclined surface (the non-observer-side surface 42) from the inside of the translucent part 3. The light then passes through the observer-side surface 41 and travels in the display surface-perpendicular direction H, or travels straight to the observer-side surface 41, passes through the observer-side surface 41, and travels in the display surface-perpendicular direction H.

To ensure that all the images displayed on the display-side inclined surface part 26 appear to the observer 100 as if they were displayed on the observer-side surface 41, the translucent part 3 may be configured such that the light corresponding to all the images displayed on the display-side inclined surface part 26 passes through the observer-side surface 41 in the display surface-perpendicular direction H. As the translucent part 3, the translucent part 3 that protrudes from the partial region 26A of the display-side inclined surface part 26 as a protruding start point or the translucent part 3 that protrudes from the entire region of the display-side inclined surface part 26 as the protruding start point is present. In both cases, the aspect of the translucent part 3 is determined in consideration of the correlation between the inclination angle, the size, and the like, of the display-side inclined surface part 26 and the inclination angle, the size, and the like, of the translucent-side inclined surface (the non-observer-side surface 42) with respect to the observer-side surface 41 (the parallel surface part 410). These configurational aspects are also true for <First Embodiment> and <Second Embodiment>.

When an inverted image is displayed on the observer-side surface 41, a control part 5 that controls the display part 2 (the display panel parts 20), may be provided with an inverting part 50 that inverts an original image portion corresponding to the inverted image and displays the inverted image from the beginning in the display-side inclined surface part 26, as shown in FIG. 9C. As a result, for the observer 100 who sees in the display surface-perpendicular direction H, the original image appears on the observer-side surface 41. It is also possible to apply or vapor-deposit a prescribed material (e.g. aluminum) on the non-observer-side surface 42 to prevent light from passing from the non-observer-side surface 42 to the adjacent display panel part 20.

It should be noted that the translucent parts 3 described in <First Embodiment> to <Third Embodiment> as above functions as a display auxiliary member configured to assist the display in the display part 2. Thus, when the translucent parts 3 are used as the display auxiliary member in known display devices, the effects as described above can be obtained.

The respective elements of the display devices 1 described in <First Embodiment> to <Third Embodiment> as above can be appropriately combined with one another to form display devices 1 and display auxiliary members, which are included in the scope of the present invention.

It should be noted that the display device and the display auxiliary member of the present invention are not limited to the above-described embodiments, and various modifications can be made without departing from the gist of the present invention.

The invention claimed is:

1. A display device comprising:
   a display region having:
      a first display body having a top and a bottom opposite to each other along a first direction and a first side at an outer edge of the first display body, the first side having a first inclined surface, the first inclined surface extending from the top to the bottom of the first display body; and
      a second display body having a top and a bottom opposite to each other along the first direction and a second side at an outer edge of the second display body, the second side having a second inclined surface, the second inclined surface extending from the top to the bottom of the second display body, the first and second sides being parallel to each other such that the first and second inclined surfaces face each other across a gap; and
   a first translucent cover disposed over the gap, the first translucent cover having a top surface and a bottom surface opposite to each other along the first direction the first translucent cover including a material having translucency, the first translucent cover extending from at least part of the first inclined surface toward the second display body over the gap, at least the bottom surface being inclined with respect to the top surface such that a thickness along the first direction of the first translucent cover adjacent to the first inclined surface is larger than a thickness along the first direction of the first translucent cover adjacent to the second display body,
   wherein there is a space between the bottom surface of the first translucent cover and at least the second inclined surface of the second display body.

2. The display device according to claim 1, further comprising:
   a second translucent cover disposed over the gap, the second translucent cover having a top surface and a bottom surface opposite to each other along the first direction, the second translucent cover including the material having translucency, the second translucent cover extending from at least part of the second inclined surface toward the first display body over the gap, at least the bottom surface of the second translucent cover being inclined with respect to the top surface of the second translucent cover such that a thickness along the first direction of the second translucent cover adjacent to the second inclined surface is larger than a thickness along the first direction of the second translucent cover adjacent to the first display body, wherein there is a space between the bottom surface of the second translucent cover and at least the first inclined surface of the first display body, and a distal end of the first translucent cover and a distal end of the second translucent cover directly face each other or overlap each other along the first direction.

3. The display device according to claim 1,
wherein only the first translucent covers over the gap.

4. The display device according to claim 1,
wherein a top surface at the to of the first display body is coplanar with at least part of the top surface of the first translucent cover.

5. The display device according to claim 4,
wherein a distal end of the first translucent cover is downwardly bent toward the bottom of the first display body.

6. The display device according to claim 1,
wherein a height along the first direction of the space from a bottom of the gap is larger than the thickness of at least part of the first translucent cover.

7. The display device according to claim 1,
wherein the first translucent cover protrudes from the first inclined surface of the first display body toward the second display body, and
a distal end of the first translucent cover has a protruding curved surface.

8. A display auxiliary member for use in a display device, the display device including a display region having:

a first display body having a top and a bottom opposite to each other along a first direction and a first side at an outer edge of the first display body, the first side having a first inclined surface, the first inclined surface extending from the top to the bottom of the first display body; and a second display body having a top and a bottom opposite to each other along the first direction and a second side at an outer edge of the second display body, the second side having a second inclined surface, the second inclined surface extending from the top to the bottom of the second display body, the first and second sides being parallel to each other such that the first and second inclined surfaces face each other across a gap, the display auxiliary member comprising:

a first translucent cover disposed over the gap, the first translucent cover having a top surface and a bottom surface opposite to each other along the first direction, the first translucent cover including a material having translucency, the first translucent cover extending from at least part of the first inclined surface toward the second display body over the gap, at least the bottom surface being inclined with respect to the top surface such that a thick n along the first direction of the first translucent cover adjacent to the first inclined surface is larger than a thickness along the first direction of first translucent cover adjacent to the second display body, wherein there is a space between the bottom surface of the first translucent cover and at least the second inclined surface of the second display body.

9. The display auxiliary member according to claim 8, further comprising:

a second translucent cover disposed over the gap, the second translucent cover having a top surface and a bottom surface opposite to each other along the first direction, the second translucent cover including the material having translucency, the second translucent cover extending from at least part of the second inclined surface toward the first display body over the gap, at least the bottom surface of the second translucent cover being inclined with respect to the top surface of the second translucent cover such that a thickness along the first direction of the second translucent cover adjacent to the second inclined surface is larger than a thickness along the first direction of the second translucent cover adjacent to the first display body, wherein there is a space between the bottom surface of the second translucent cover and at least the first inclined surface of the first display body, and a distal end of the first translucent cover and a distal end of the second translucent cover directly face each other or overlap each other along the first direction.

10. The display auxiliary member according to claim 8, wherein only the first translucent covers over the gap.

11. The display auxiliary member according to claim 8, wherein a top surface at the top of the first display body is coplanar with at least part of the top surface of the first translucent cover.

12. The display auxiliary member according to claim 11, wherein a distal end of the first translucent cover is downwardly bent toward the bottom of the first display body.

13. The display auxiliary member according to claim 8, wherein a height along the first direction of the space from a bottom of the gap is larger than the thickness of at least part of the first translucent cover.

14. The display auxiliary member according to claim 8, wherein the first translucent cover protrudes from the first inclined surface of the first display body toward the second display body, and
a distal end of the first translucent cover has a protruding curved surface.

* * * * *